April 2, 1968  R. A. HANSON  3,375,765
HIGHWAY SURFACING TRIMMER AND SPREADER
Filed Oct. 14, 1965  5 Sheets-Sheet 1

INVENTOR.
RAYMOND A. HANSON
BY
ATTYS.

INVENTOR.
RAYMOND A HANSON
BY
ATTYS.

United States Patent Office 3,375,765
Patented Apr. 2, 1968

3,375,765
HIGHWAY SURFACING TRIMMER AND SPREADER
Raymond A. Hanson, c/o R. A. Hanson Co., Palouse, Wash. 99161
Filed Oct. 14, 1965, Ser. No. 495,798
3 Claims. (Cl. 94—44)

ABSTRACT OF THE DISCLOSURE

The invention disclosed herein is concerned with the use of first and second consecutive augers on an apparatus for trimming and spreading material along a path such as a roadway. The first auger is utilized to spread excess material across a supporting framework in a first transverse direction and the second auger is used to spread such material in an opposite direction. At the delivery end of the first auger is a transfer device in the form of radial paddles fixed to the auger to shift material rearwardly. The material passes through an aperture or opening in the crumber shoe immediately rearward of the first auger. A discharge opening on the framework at the delivery end of the second auger is also provided to receive material finally discharged after passage of the machine.

---

Figure 1:
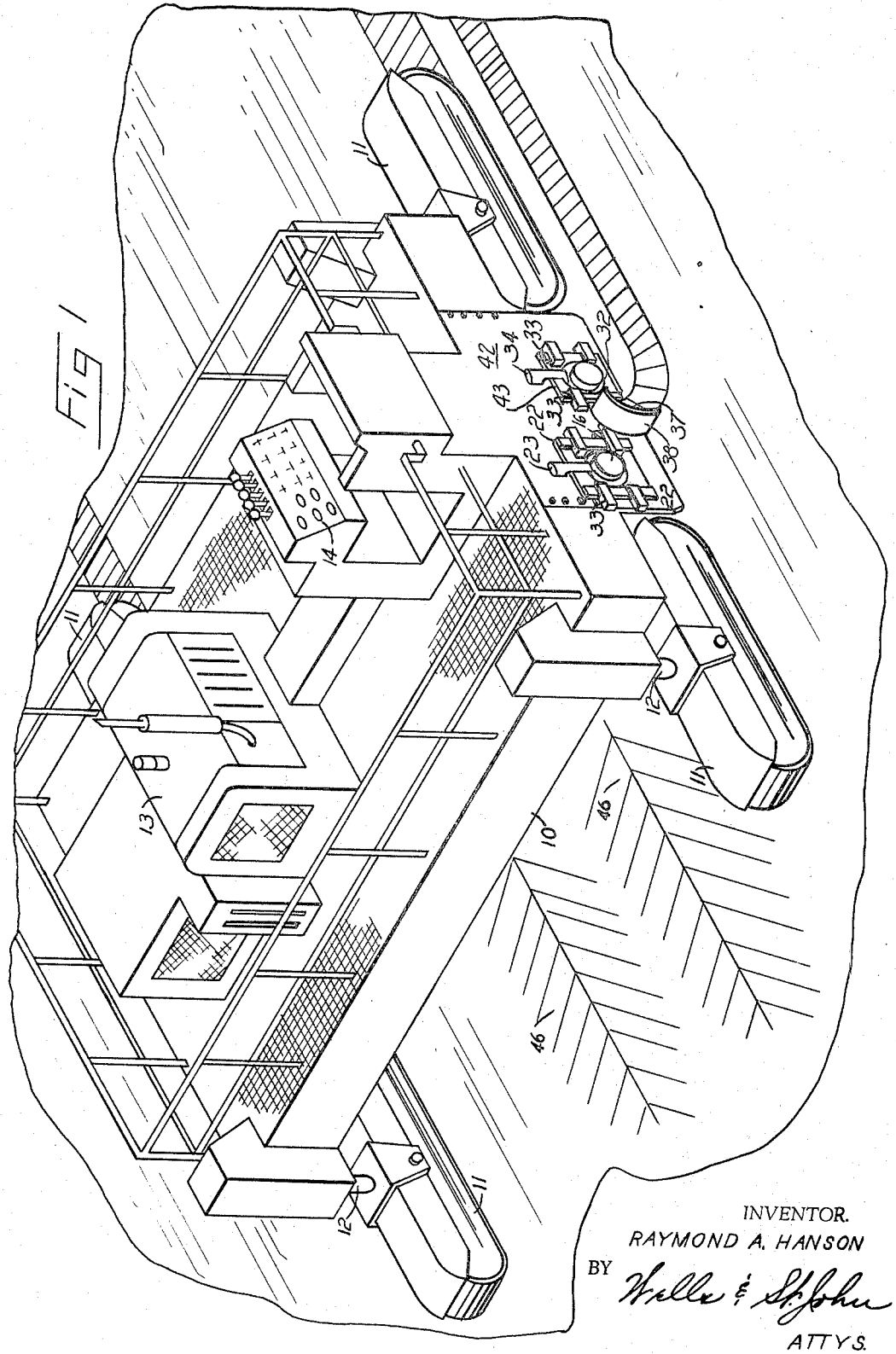

This invention relates to a novel highway trimmer and spreader adapted to evenly spread loose particulated materials placed upon a highway right of way as the machine travels longitudinally parallel to the desired highway surface.

This invention is concerned with an improvement in a highway trimming and spreading apparatus. The purpose of the apparatus is to spread loose aggregate or other particulated material across a highway surface, the apparatus disclosed herein being adapted to spread the material first in one direction across the width of a machine and then in the opposite direction so as to insure greater uniformity in the final roadbed.

One object of this invention is to provide a rather simple apparatus for effectively spreading sufficient quantities of material to complete the trimming of a roadbed in one pass of the machine.

Another object of this invention is to provide a machine capable of being automatically controlled, the operation of the machine requiring only a single operator.

Another object of this machine is to provide a trimming and spreading device which spreads material with an even density across the entire width of the machine so that paving material can be spread directly on the completed surface.

These and further objects will be evident from the following disclosure, taken together with the accompanying drawings which illustrate a preferred form of the invention. It is to be understood that this form of the invention is not intended to limit the scope of the invention, which is set out in the claims which follow.

Figure 2:
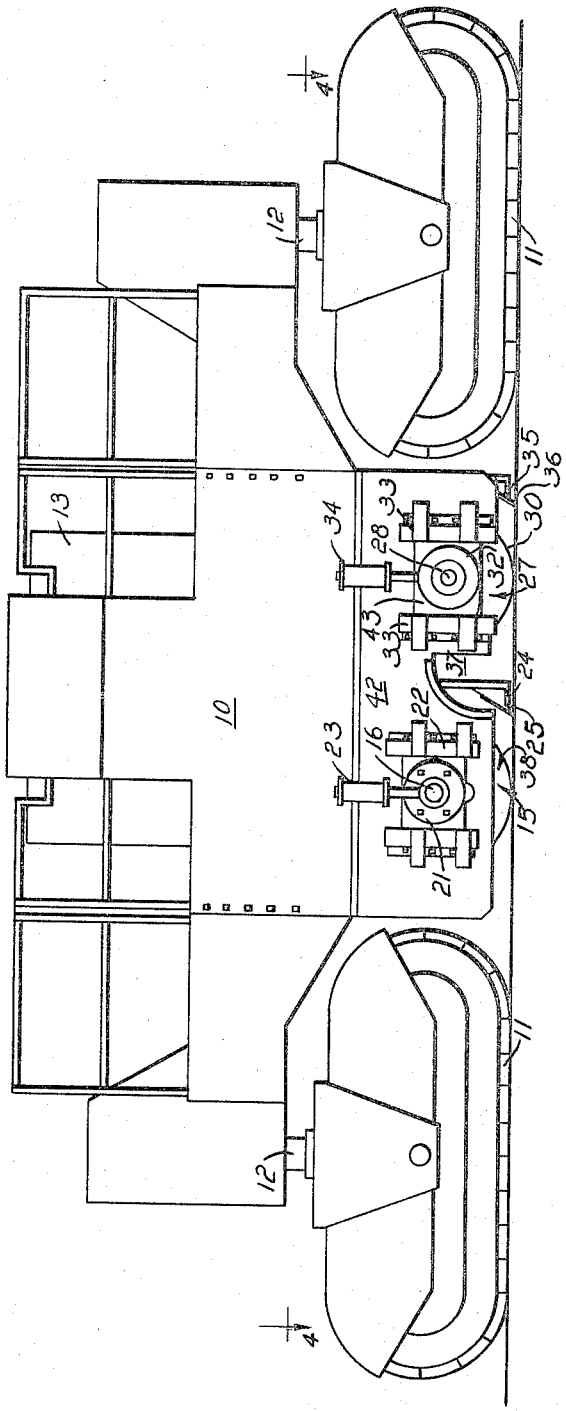
Figure 3:
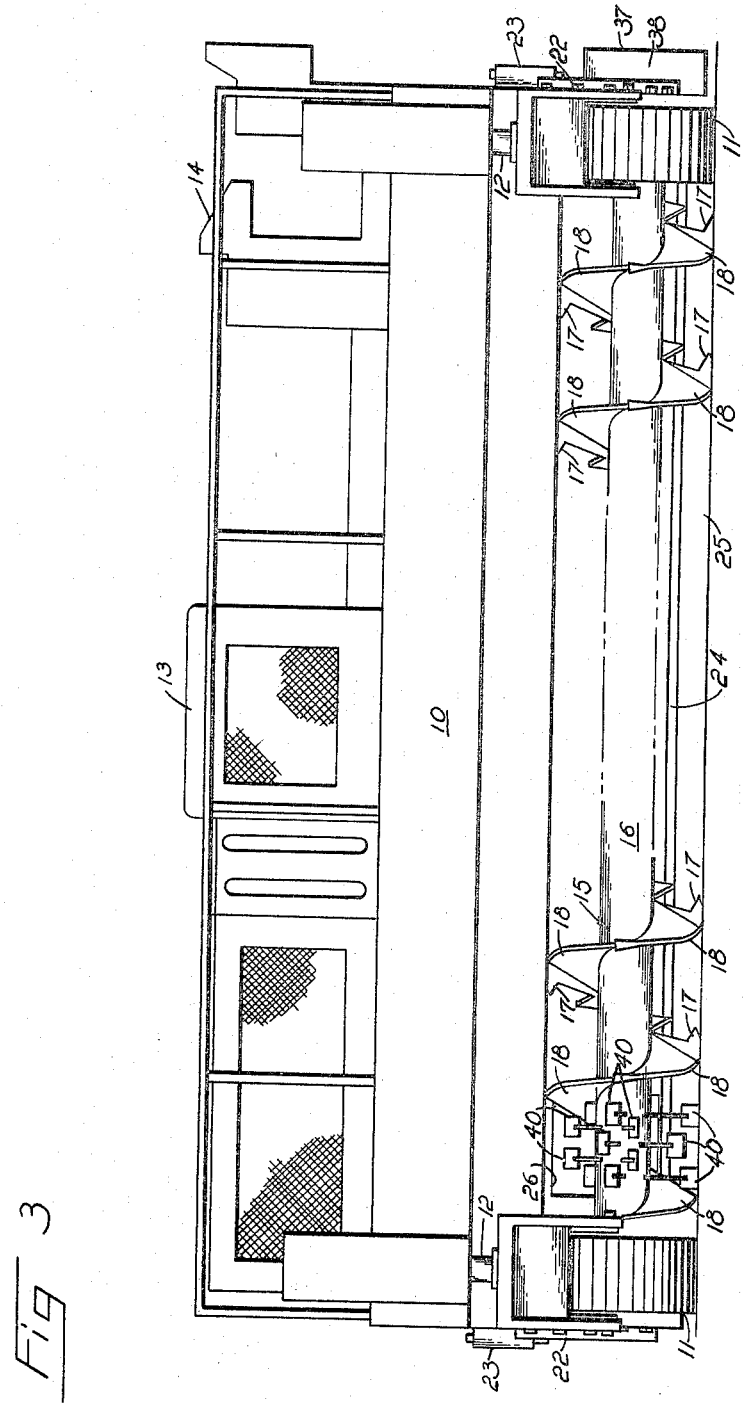
Figure 4:
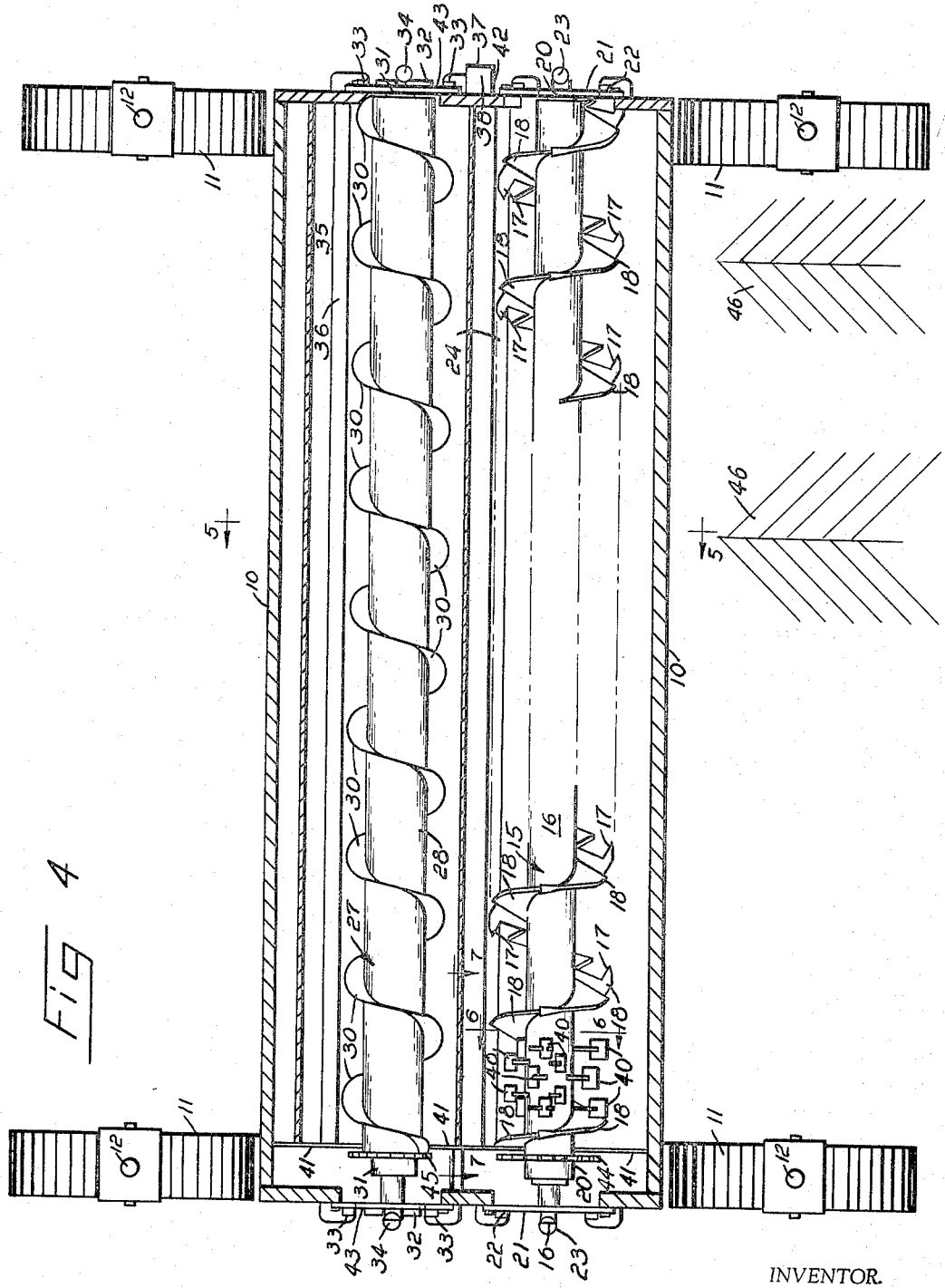
Figure 5:
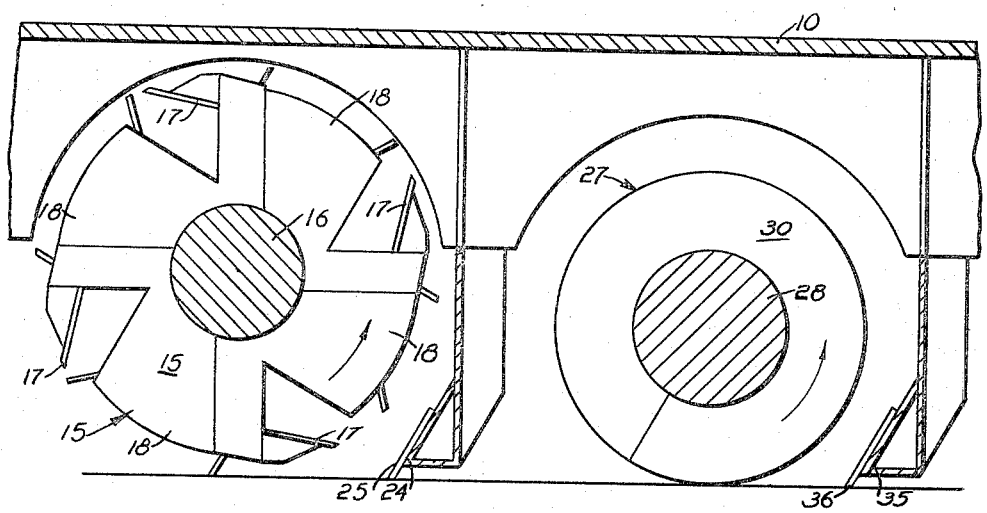
Figure 6:
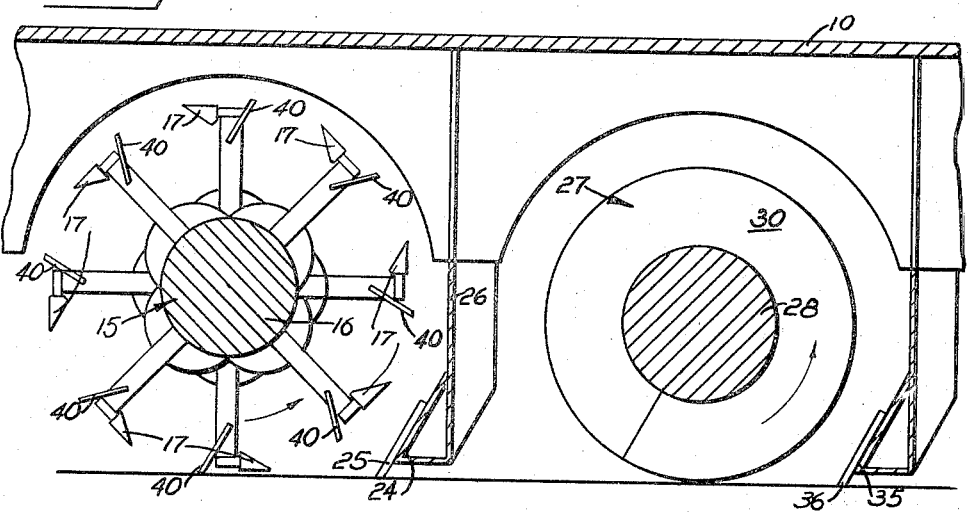
Figure 7:
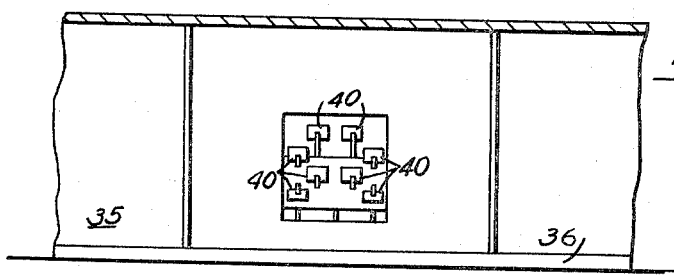

In the drawings:

FIGURE 1 is a front perspective view of the machine;
FIGURE 2 is a side elevation view of the machine;
FIGURE 3 is a front elevation view of the machine;
FIGURE 4 is a horizontal view taken along line 4—4 in FIGURE 2;
FIGURE 5 is an enlarged fragmentary sectional view taken along line 5—5 in FIGURE 4;
FIGURE 6 is a view similar to FIGURE 5 taken along line 6—6; and
FIGURE 7 is a fragmentary sectional view taken along line 7—7 in FIGURE 4.

Referring to the drawings, the basic combination of elements which make up the present machine can be best seen in FIGURES 1 through 4. The machine comprises a fabricated mobile supporting framework 10. Framework 10 is supported by four track assemblies 11 carried for adjustment relative to framework 10 by supports 12. At the top of the machine is a conventional engine 13 which powers the various hydraulic and mechanical systems. A control panel 14 is illustrated from which the operator of the machine can supervise the various controls and direct the operation of the machine.

The details of the track assemblies 11 are not given, since they are conventional tracks driven by hydraulic motors or other suitable mechanisms. The tracks are adjustably carried by supports 12 for vertical adjustment and for steering. The controls of the tracks 11 can be either manual or automatic. In a typical case, the movement of framework 10 will be automatically governed by controls which monitor the position of framework 10 relative to a fixed guide line or string.

Mounted beneath the framework 10 are two augers which perform the trimming and spreading operations. The front auger 15 comprises a transverse shaft 16 which is rotatably carried at its outer ends by outboard bearings 20. The bearings 20 are respectively fixed to mounting plates 21 slidably carried on framework 10 between fixed guides 22 for vertical adjustment. Adjustment of plates 21 is effected by cylinder assemblies 23 anchored to the framework 10 and best seen in FIGURE 2. Adjustment of the cylinder assemblies 23 causes adjustment of the elevation of the front auger 15 relative to the ground surface on which the tracks 11 ride.

Directly behind the front auger 15 is a front crumber shoe 24. This is simply a curved blade having a transverse straight lower edge 25 located at the same elevation as the bottom peripheral edge of the auger 15.

The front auger 15 is a trimming auger having a series of spirally positioned radial digging teeth 17 fixed to the shaft 16. Teeth 17 are directed for rotational movement of shaft 16 in the direction indicated by the arrows in FIGURES 5 and 6. Directly behind each tooth 17 is an auger segment 18, the various segments 18 cooperating to form a spiral auger blade capable of moving material to the left as shown in FIGURE 4 when the shaft 16 is rotated as indicated.

The outside diameter of teeth 17 relative to the rotational axis of shaft 16 is slightly greater than the outside diameter of the auger segments 18. Thus, material contacted by the front auger 15 will be "fluffed" by contact of the teeth 17, and excess material will be spread to the left by contact with the auger segments 18. These two components of the front auger 15 serve to alternately compact and loosen the material to provide a uniform material consistency across the width of the machine.

At the left side of the front auger 15 are radial paddles 40 fixed to the digging teeth 17. Paddles 40 throw material contacted by them in a rearward direction toward the crumber shoe 24. The crumber shoe 24 is provided with an opening 26 above its lower edge 25 directly rearward of the paddles 40, so that material contacted by paddles 40 can pass rearwardly through the crumber shoe 24.

Directly adjacent to the left hand end of the front auger 15 is a vertical protective plate 41 having a suitable vertical slot to receive the shaft 16. Plate 41 does not interfere with vertical adjustment of the shaft 16, but does prevent movement of material along shaft 16 beyond its inner boundary.

Rearward of the front auger 15 is a rear auger 27 which is basically a trimming and spreading auger. It does not have the digging teeth provided on the front auger 15. The rear auger 27 comprises a horizontal transverse shaft 28 with a continuous auger blade 30 fixed to its outer surface. The diameter of the rear auger 27 can be slightly less than that of the front auger 15. Shaft 28 is carried by outboard bearings 31 on plates 32. Plates 32 are guided for vertical adjustment within stationary guides 33. Movement of the bearings 31 and plates 32 is effected by cylinder assemblies 34 at each side of the machine.

Behind the rear auger 27 is a rear crumber shoe 35 having a continuous transverse lower edge 36, the elevation of the edge 36 being just slightly beneath the elevation of the lower periphery of rear auger 27.

At the right hand end of rear auger 27 (FIGURES 2 and 4) there is an opening 37 in the side wall 42 of the framework 10. This opening, located just forward of the vertically adjustable plate 32, permits excess material to be discharged from the framework 10 at the delivery end of the rear auger 27. Opening 37 is protected by a partial cover 38 fixed to the framework 10.

Rear auger shaft 28 also is received within an upright plate 43 fixed to framework 10 and having provision to accommodate vertical movement of shaft 28. The two plates 41 and 43 shield sprockets 44 and 45 fixed respectively to the shafts 16 and 28. Sprockets 44, 45 are driven by a chain (not shown) powered by the main engine 13. The shafts 16, 28 are turned in the same direction as indicated in FIGURES 5 and 6. The speed of rotation of shafts 16, 28 will be dependent upon the nature of material being spread and the depth at which it is being worked.

The front auger 15 can be either above the rear auger 27 or at substantially the same height (FIGURES 5 and 6). The relative height of the augers 15, 27 is again dependent upon the nature of the material being spread.

As seen in FIGURE 1, material to be spread is dumped along the right of way in windrows 46 and is first contacted by the front digging auger 15. The windrows must extend substantially to the right hand end of auger 15 as seen in FIGURE 4, so that material contacted by the teeth 17 and auger segments 18 can be shifted across the entire width of the machine. After the initial digging action and motion of the material due to cotnact with a front auger 15, excess material is carried to the left and discharged by paddles 40 through the opening 26 of the front crumber shoe 24. The levelled material is then scraped by the lower edge 25 of the vertically adjustable front crumber shoe 24. The crumber shoe 24 is adjustably carried on framework 10 and set at the working height of the front auger 15. Material then is moved from left to right on the rear auger 27, again spreading the material to fill any voids, particularly at the right hand end of the machine. Excess material is ejected through the discharge opening 37. As a final operation, the rear crumber shoe 35 levels the surface and produces a smooth top surface for paving purposes.

Various modifications can be made in this machine. Vibrating compactors or other types of compacting apparatus can be used between or after any of the augers. More augers can be added for better working of the material if this is necessary. Basically, this disclosure is concerned with a machine that spreads loose material from one side of the road bed to the other and back again so as to provide a consistent subgrade or base for paving purposes and to eliminate the possibility of voids by always spreading excess material and discharging it to the side of the right of way.

Having thus described my invention, I claim:

1. An apparatus for trimming and spreading particulated material along a longitudinal path, comprising:
   a framework movably supported at the sides of the intended path for motion longitudinally along the length thereof;
   a first transverse auger mounted on said framework with the lower surface thereof at an elevation adapted to spread loose material across the width of said path, said first auger having digging teeth projecting radially outward beyond auger segments oriented thereon so as to spread excess material across said framework in a first transverse direction to the delivery end thereof;
   a first crumber shoe mounted on said framework parallel to said first auger and directly rearward thereof, said first crumber shoe having a lower edge substantially equal in elevation to the lower periphery of said first auger;
   a second auger mounted on said framework rearward of said first auger, said second auger having a lower periphery in contact with material passing beneath said first crumber shoe, said second auger being oriented so as to spread excess material in a second transverse direction opposite to said first transverse direction and to the delivery ends thereof;
   a second crumber shoe rearward of said second auger and parallel thereto, said second crumber shoe having a lower edge substantially equal in elevation to the lower periphery of said second auger;
   paddle means at the delivery end of said first auger to direct material contacted thereby rearward of said auger;
   said first crumber shoe having an aperture formed therein to pass material directed by said paddle means.

2. In an apparatus for trimming and spreading particulated material along a longitudinal path;
   a framework movably supported at the sides of the intended path for motion longitudinally along the length thereof;
   first auger means mounted on said framework including a digging and spreading auger rotatably mounted thereon for motion about a transverse axis, said first auger means having a lower surface at a first elevation relative to said framework, said auger being oriented so as to spread excess material across said framework in a first transverse direction to the delivery end thereof;
   second auger means mounted on said framework rearwardly of said first auger means, including a second spreading auger mounted for rotation about a transverse axis, said second auger means having a lower surface located at a second elevation relative to said framework, said second auger being oriented so as to spread excess material across said framework in a second transverse direction opposite to said first transverse direction and to the delivery end thereof;
   material transfer means at the delivery end of said first auger in said first transverse direction to transfer excess material from said first auger means to said second auger means, said material transfer means comprising a plurality of radial paddles fixed to said first auger adapted to shift material contacted thereby in a rearward direction;
   and means on said framework to permit discharge of material from the delivery end of said second auger means opposite to the end thereof at which material is supplied by said material transfer means.

3. In an apparatus for trimming and spreading particulated material along a longitudinal path;
   a framework movably supported at the sides of the intended path for motion longitudinally along the length thereof;
   first auger means mounted on said framework including a digging and spreading auger rotatably mounted thereon for motion about a transverse axis, said first auger means having a lower surface at a first elevation relative to said framework, said auger being oriented so as to spread excess material across said framework in a first transverse direction to the delivery end thereof;
   second auger means mounted on said framework rearwardly of said first auger means, including a second spreading auger mounted for rotation about a transverse axis, said second auger means having a lower surface located at a second elevation relative to said framework, said second auger being oriented so as to spread excess material across said framework in a second transverse direction opposite to said first transverse direction and to the delivery end thereof;

material transfer means at the delivery end of said first auger in said first transverse direction to transfer excess material from said first auger means to said second auger means;

means on said framework to permit discharge of material from the delivery end of said second auger means opposite to the end thereof at which material is supplied by said material transfer means;

and a discharge opening on said framework adjacent to the delivery end of said second auger, said opening being adapted to permit discharge of material from said second auger after spreading thereof.

References Cited
UNITED STATES PATENTS

| | | | |
|---|---|---|---|
| 1,953,890 | 4/1934 | Allen | 94—44 |
| 2,093,766 | 9/1937 | Rich | 94—44 |
| 2,328,888 | 9/1943 | Bell | 94—44 |
| 2,481,679 | 9/1949 | Miller | 94—44 |

CHARLES E. O'CONNELL, *Primary Examiner.*

NILE C. BYERS, *Examiner.*